US009002050B2

(12) United States Patent
Widner et al.

(10) Patent No.: US 9,002,050 B2
(45) Date of Patent: Apr. 7, 2015

(54) TRIANGLE SPEAKER FOR TABLET COMPUTER

(75) Inventors: Roger Widner, Farmington, MN (US); Amy Prescott, Minneapolis, MN (US)

(73) Assignee: BBY Solutions, Inc., Richfield, MN (US)

( * ) Notice: Subject to any disclaimer, the term of this patent is extended or adjusted under 35 U.S.C. 154(b) by 405 days.

(21) Appl. No.: 13/410,437

(22) Filed: Mar. 2, 2012

(65) Prior Publication Data

US 2013/0230202 A1 Sep. 5, 2013

(51) Int. Cl.

*H04R 9/06* (2006.01)
*H04R 5/02* (2006.01)
*H04B 7/00* (2006.01)
*H04B 1/38* (2006.01)

(52) U.S. Cl.

CPC ............ *H04R 5/02* (2013.01); *H04R 2205/021* (2013.01); *H04R 2499/15* (2013.01); *Y10T 29/49826* (2015.01)

(58) Field of Classification Search

CPC ............ H04R 1/02; H04R 1/028; H04R 1/26; H04R 1/025; H04R 5/02; H04R 5/023
USPC ......... 381/332, 333, 334, 336, 300, 304, 306, 381/182, 383, 388; 455/41.2, 41.3, 73, 78
See application file for complete search history.

(56) References Cited

U.S. PATENT DOCUMENTS

| | | | | |
|---|---|---|---|---|
| 6,043,976 | A | 3/2000 | Su | |
| D535,976 | S | 1/2007 | Ng | |
| D559,832 | S | 1/2008 | Poandl | |
| D594,845 | S | 6/2009 | Skurdal | |
| D619,116 | S | 7/2010 | Skurdal | |
| 7,756,286 | B2 | 7/2010 | Kim | |
| D641,338 | S | 7/2011 | Chen | |
| D672,333 | S | 12/2012 | Lin | |
| D672,334 | S | 12/2012 | Tzeng | |
| 2003/0063765 | A1 | 4/2003 | Lu | |
| 2007/0274547 | A1* | 11/2007 | Ueno | 381/306 |

(Continued)

FOREIGN PATENT DOCUMENTS

| | | |
|---|---|---|
| CA | 2733214 | 10/2011 |
| CA | 2752520 | 10/2011 |

(Continued)

OTHER PUBLICATIONS

Range (R. Govindan); Technabob.com; http://technabob.com/2012/04/26/rocketfish-ipad-sound-prism-speaker; dated Apr. 26, 2012; accessed Mar. 23, 2013; 3 p.
May 28, 2013 PCT Search Report (Serial No. PCT/US13/028254)—Our Matter 4984.
Logitech, Getting Started with Premiere Utilisation, Logitech Tablet Speaker, 2011.

*Primary Examiner* — Vivian Chin
*Assistant Examiner* — David Ton
(74) *Attorney, Agent, or Firm* — Beck & Tysver, PLLC

(57) ABSTRACT

A speaker bar for a tablet computer is presented. The speaker bar is sized to fit inside a cover of the tablet computer by folding or rolling the speaker bar inside the cover. The speaker bar has retractable speaker members that extend outward beyond the edges of the speaker bar housing along a longitudinal axis of the speaker bar. Power is provided to the speaker bar when the retractable members are extended, and the power is turned off when the retractable members are retracted. The speaker bar connects to a tablet computer via Bluetooth wireless connection.

18 Claims, 7 Drawing Sheets

(56) References Cited

U.S. PATENT DOCUMENTS

| | | | | |
|---|---|---|---|---|
| 2008/0095395 | A1 | 4/2008 | Pieklik et al. | |
| 2009/0080684 | A1 | 3/2009 | Groset et al. | |
| 2009/0180660 | A1 | 7/2009 | Groset et al. | |
| 2010/0246874 | A1 | 9/2010 | Chung | |
| 2011/0235847 | A1 | 9/2011 | Bhutani et al. | |
| 2012/0068798 | A1 | 3/2012 | Lauder et al. | |
| 2013/0083953 | A1 * | 4/2013 | Chang | 381/333 |
| 2013/0142371 | A1 * | 6/2013 | Martin et al. | 381/333 |

FOREIGN PATENT DOCUMENTS

| | | |
|---|---|---|
| KR | 20060025379 | 3/2006 |
| KR | 30-06052260000 | 7/2011 |
| WO | 2009126131 | 10/2009 |

* cited by examiner

TRIANGLE SPEAKER FOR TABLET COMPUTER

FIELD OF THE INVENTION

The present invention relates to the field of external speakers for portable electronic devices. More particularly, the described embodiments relate to a wireless speaker system having a speaker housing and two stereo speaker elements that can be extended from or retracted into the speaker housing. The wireless speaker system may be folded inside a cover of a tablet computer to provide a stand while also providing improved sound quality for the tablet computer.

SUMMARY

In one embodiment of the present invention, an elongated speaker bar for a tablet computer has a speaker bar housing and retractable speaker members that extend and retract for easy portability when not in use. The speaker bar receives wireless audio signals from the tablet computer and plays back the audio. The speaker bar may be sized to fold inside a cover of the tablet computer to create a stand. The tablet computer cover may be a Smart Cover for an iPad tablet computer sold by Apple, Inc. (Cupertino, Calif.) and described in Canadian patent application CA2733214A1, (U.S. application Ser. No. 12/971,624). The speaker bar could also be adapted for use with other covers or stands for tablet computers. The speaker bar may also be used independently of a tablet computer cover. In one embodiment the speaker bar may have a ferromagnetic material appropriately placed to couple with a magnet on the cover of the tablet computer to increase the ease of coupling the speaker bar with the tablet cover.

In the disclosed embodiment, retractable members containing speaker assemblies extend and retract along a longitudinal axis of the speaker bar, such that the distance between the retractable members increases when the speaker elements are extended, and the distance between the speaker elements decreases when the speaker elements are retracted into the speaker bar housing. In the disclosed embodiment, the retractable members extend and retract independently of one another.

A rechargeable battery powers the speaker bar. At least one of the retractable members is operably connected to a power actuator that actuates a switch to provide power to the speaker bar. When the retractable member is retracted, the switch opens (i.e., breaks) the circuit and turns the speaker bar off. When the retractable member is extended, the switch closes (i.e., completes) a circuit and turns the speaker bar on.

In the preferred embodiment the speaker communicates with the tablet computer wirelessly. The wireless communication protocol may be a Bluetooth protocol, an IEEE 802.11 protocol, or any other appropriate wireless communication standard. Wireless communication is initiated automatically when the power actuator causes the switch to turn the speaker bar on. In the preferred embodiment, the wireless communication first attempts to connect to the tablet computer to which it was last connected. If the wireless communication does not detect the tablet computer to which it was last connected, the wireless communication goes into pairing mode.

DETAILED DESCRIPTION

Figure 1:
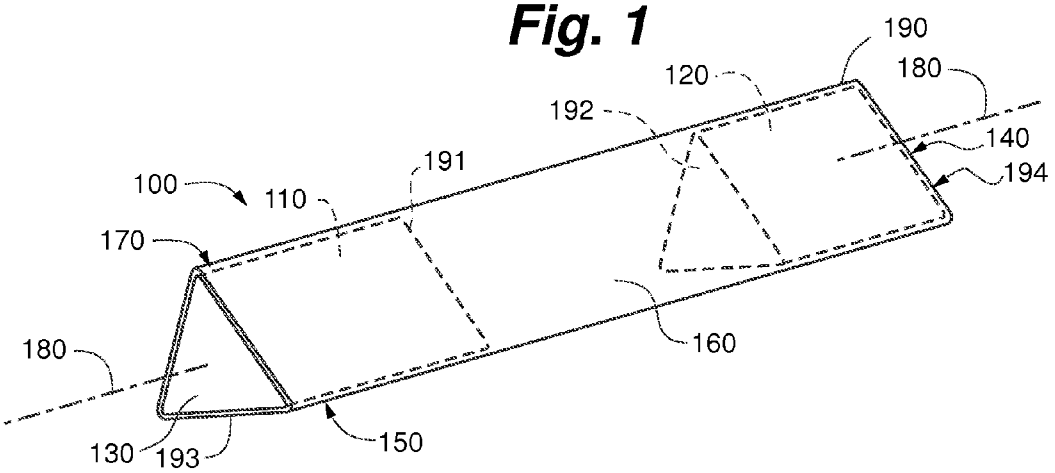
FIG. 1 is an isometric drawing showing the speaker bar with retractable members retracted.

FIG. 1 shows a speaker bar 100 having a speaker housing 190. Speaker housing 190 has a side 150, side 160, and side 170 that form three sides of an elongated triangular prism having a longitudinal axis 180. The cross-section of speaker housing 190 is preferably a triangle. As shown in FIG. 1, speaker bar 100 preferably has a generally-uniform cross-section to allow speaker bar 100 to be easily coupled with a cover of a tablet computer. Sides 150, 160, 170 have equal lengths. In a preferred embodiment, the length of sides 150, 160, 170 is approximately equal to the length of a tablet computer, and also approximately equal to the length of a cover for the tablet computer.

Still referring to FIG. 1, speaker housing 190 has two internal recesses 191 and 192, which hold retractable members 110 and 120 respectively. Features 191, 192, 110, 120 are represented in FIG. 1 with dashed lines, indicating that they are located inside of speaker housing 190. Retractable members 110 and 120 are moveable along the longitudinal axis 180 of speaker housing 190. In a recessed position, retractable members 110, 120 have ends 130 and 140 that are flush with ends 193, 194 of housing 190. Retractable members 110, 120 are capable of being extended outside of speaker housing 190. Ends 130, 140 protrude outward and the distance between retractable members 110, 120 increases when extended. Conversely, the distance between retractable members 110, 120 decreases when retracted. Speaker housing 190 is preferably formed of a solid but lightweight material such as extruded aluminum that protects retractable members 110, 120 when they are retracted. The smaller form factor of speaker bar 100 when the retractable members 110, 120 are retracted provides improved portability.

Figure 2:
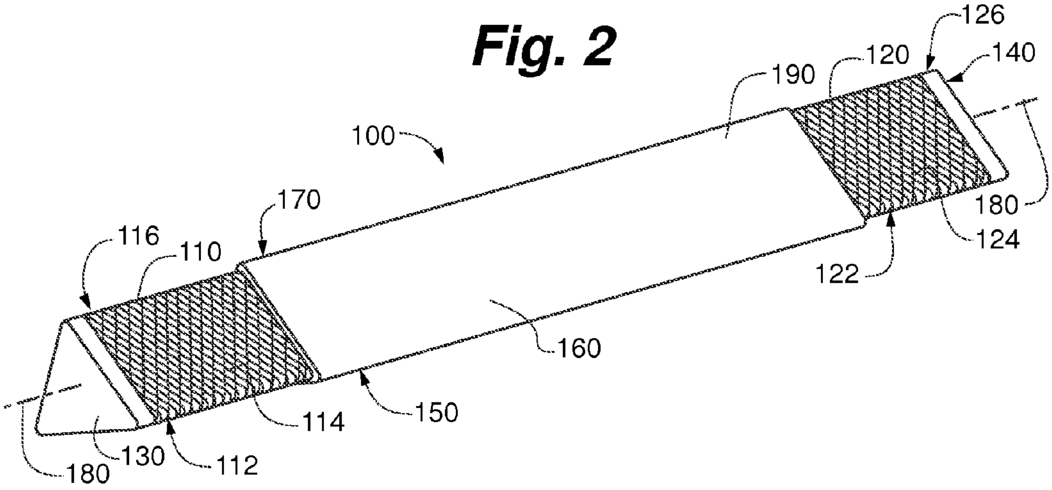
FIG. 2 is an isometric drawing showing the speaker bar with the retractable members extended.

FIG. 2 depicts retractable members 110, 120 extended beyond edges 193, 194 of speaker housing 190. In the preferred embodiment, retractable member 110 has a base 112, front side 114 and back side 116 that form three sides of a triangular prism having a triangle cross-section. Retractable member 120 also has the shape of a triangular prism, with a triangular cross-section defined by base 122, front side 124 and back side 126. Ends 130 and 140 have a two-dimensional shape geometrically similar (i.e., having the same geometric interior angles, but scaled so that the lengths of each side are not necessarily the same) to the cross-section of speaker housing 190, but are sized to allow retractable members 110, 120 to be recessed into the speaker housing 190. Likewise, retractable members 110, 120 each have a three-dimensional triangular prism shape that is geometrically similar to that of housing 190, but sized to allow retractable members 110, 120 to be recessed into the speaker housing 190. In a preferred embodiment, retractable members 110, 120 are capable of being retracted and extended independently of one another.

Retractable members 110, 120 each house a speaker assembly (shown in FIG. 7) for producing sound. In the preferred embodiment, the speaker assemblies include a speaker, such as a cone speaker, oriented outward from sides 114, 124 in a forward direction orthogonal to the longitudinal axis 180 of speaker housing 190. Orienting the speaker assemblies in an orthogonal direction rather than in a direction parallel to the longitudinal axis 180 provides optimal sound quality for a user of speaker bar 100.

Figure 3:
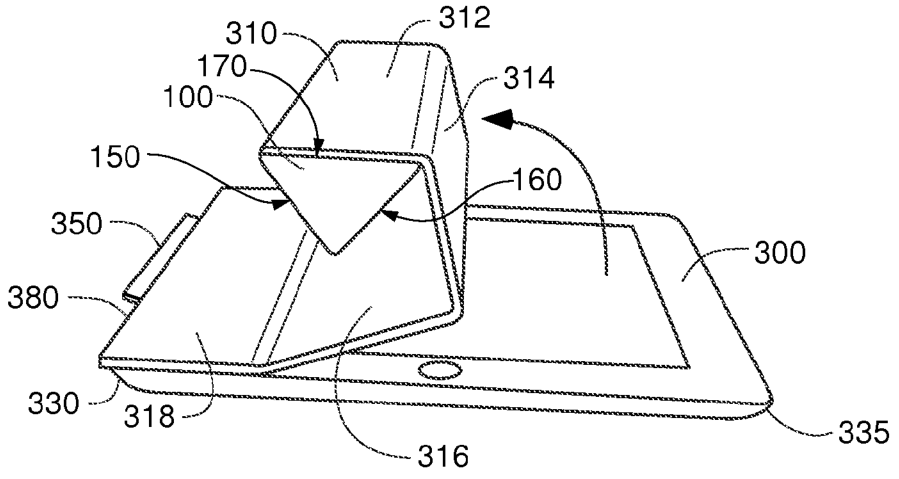
FIG. 3 is an isometric drawing of the speaker bar being installed into a cover of a tablet computer.

FIG. 3 shows the speaker bar 100 being coupled with a tablet computer cover 310 of the tablet computer 300. Cover 310 has a length and width approximately equal to the length and width of the tablet computer 300. In the preferred embodiment the length of speaker bar 100 is also approximately equal to the length of the tablet computer 300 and cover 310. In the embodiment of FIG. 3, cover 310 is partitioned into four segments of equal length. Each cover segment is adjacent lengthwise to at least one other cover segment. The cover 310 of FIG. 3 comprises segments 312, 314, 316, and 318. Tablet computer 300 has an edge 330 that connects to cover 310 at an edge 380 of cover 310. A hinge mechanism 350 on cover 310 attaches cover 310 to tablet computer 300.

Figure 4:
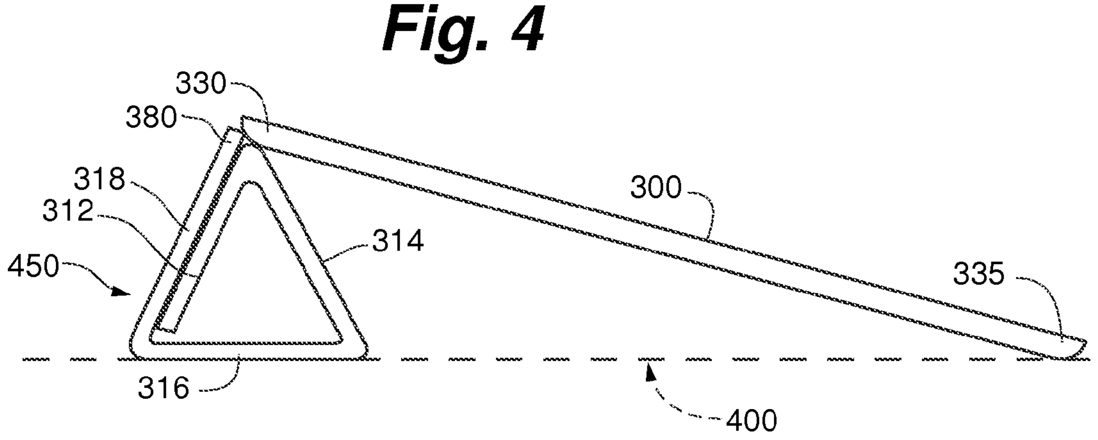
FIG. 4 is a side plan view of the tablet computer cover being used as a stand for the tablet computer.

FIG. 4 shows a side-view of cover 310 in a triangular prism configuration 450 without speaker bar 100. In normal use, cover 310 is foldable into a triangular prism shape by rolling sides 312, 314, 316 into a triangular tube, then engaging side 318 with side 312. The cover 310 is used as a stand by rotating the triangular prism configuration 450 toward the back of tablet computer 300; resting segment 316 on a surface 400; resting edge 330 of the tablet computer 300 on the edge 380; and resting edge 335 of the tablet computer 300 on the surface 400.

Speaker bar 100 provides an improvement to the multimedia experience provided by tablet computer 300 by advantageously coupling with cover 310. Referring again to FIG. 3, speaker bar 100 can be rolled inside cover 310 while cover 310 is folded into triangular prism configuration 450. The preferred embodiment in FIG. 3 shows segment 312 in physical contact with side 170 of speaker bar 100. Segment 312 and side 170 remain in physical contact as long as speaker bar 100 is coupled with cover 310. Speaker bar 100 is rolled inside of cover 310 by placing side 170 of speaker bar 100 into contact with segment 312; rotating speaker bar 100 to place side 160 into contact with segment 314; rotating speaker bar 100 to place side 150 in contact with segment 316; then rotating speaker bar 100 and cover 310 to engage segment 312 with segment 318. In this manner cover 310 is again in the triangular prism configuration 450 of FIG. 4, but speaker bar 100 is now coupled with cover 310 to provide an improved stand for tablet computer 300.

Figure 5:
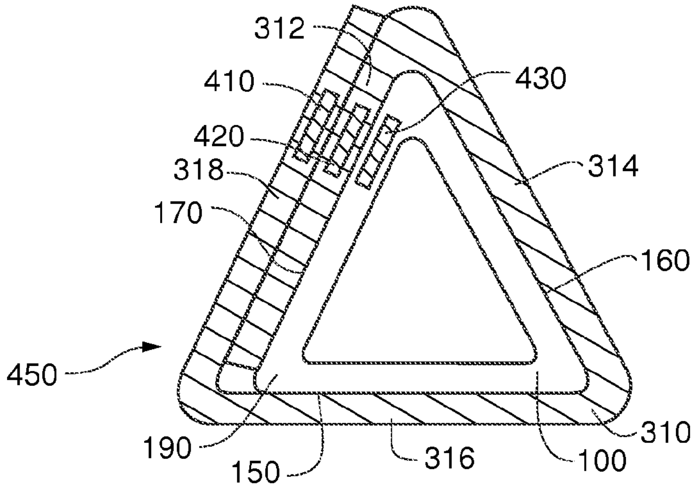
FIG. 5 is a cross-sectional view of the speaker bar folded inside of the tablet computer cover.

FIG. 5 shows a cross-sectional view of the speaker bar 100 folded inside of tablet computer cover 310 in triangular prism configuration 450. For simplicity, tablet computer 300 is not shown. As demonstrated in FIG. 5, sides 170, 160, and 150 of speaker bar 100 are sized to fit very closely to segments 312, 314, and 316 respectively. The resulting frictional engagement between the speaker bar 100 and the cover 310 in its triangular prism configuration 450 prevents speaker bar 100 from sliding through cover 310. Speaker bar 100 may also have a textured exterior surface. The texture of the exterior surface creates friction between speaker bar 100 and cover 310, providing an improved friction fit and further preventing slippage. The housing of speaker bar 100 is preferably constructed of metal, such as extruded aluminum. This adds strength and durability to the speaker bar 100, and protects retractable members 110, 120 from damage when retracted. Unfortunately, aluminum is not ferromagnetic, so it is not detectably attracted to magnetic fields. As a result, magnets found within the tablet cover 310 would not attract the aluminum material that composes the shell of the housing 190.

To compensate for this, magnetic material may be strategically placed on or within a magnetic section of speaker housing 190. The magnetic section may be a permanent magnet, a non-magnetized ferromagnetic material that responds to a permanent magnet, an electromagnet, or any appropriate magnetic material. The magnetic section may align to assist cover 310 to remain closed around speaker bar 100 while cover 310 is in triangular prism configuration 450, and also may assist speaker bar 100 to remain in position while being rolled into cover 310. As shown in FIG. 5, a housing magnetic section 430 in speaker housing 190 aligns with a cover magnetic section such as a magnet 420 located in segment 312 of cover 310. Furthermore, a second cover magnetic section 410 located in segment 318 aligns with cover magnetic section 420 of segment 312. The magnetic sections 410, 420, 430 may be placed at any appropriate location along the lengths of cover 310 and speaker housing 190. In one embodiment, housing magnetic section 430 of the speaker housing 190 is positioned approximately halfway between ends 193, 194 of speaker housing 190. In one embodiment, housing magnetic section 430 is added to the inside of aluminum speaker housing 190 at a location designed to interact with known locations of magnets found in the tablet cover 310. By placing the housing magnetic section 430 on only one side 170 of the speaker housing 190, users can be assured that the speaker bar 100 is correctly positioned when folding the cover 310 around the speaker bar 100.

Figure 6A:
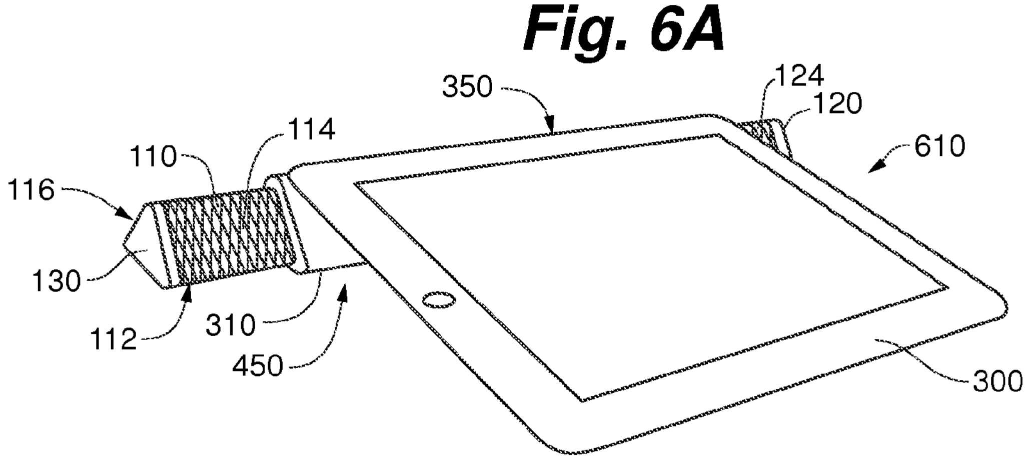
FIG. 6A is an isometric drawing showing the speaker bar with speaker elements extended, coupled with a tablet computer cover and being used as a stand for the tablet computer.

FIG. 6A shows one example of speaker bar 100 coupled with cover 310 in triangular prism configuration 450 and being used as a keyboard stand 610 for tablet computer 300. Speaker housing 190 is fully enclosed within cover 310 and is therefore not visible in FIG. 6A. Retractable members 110, 120 are extended beyond edges 193, 194 of speaker housing 190, allowing speaker bar 100 to function as an external speaker for tablet computer 300. In the preferred embodiment, the speaker assemblies project sound from front sides 114, 124 of retractable speaker members 110, 120 in a forward direction orthogonal to the longitudinal axis 180 of speaker housing 190. Orienting the speaker assemblies in an orthogonal direction rather than in a direction parallel to the longitudinal axis 180 improves the multimedia experience when the speakers are used to project sound for audio-visual media such as television and movies. In the configuration of FIG. 6A, sound travels directly from the speaker assemblies to the viewer of the tablet screen.

Figure 6B:
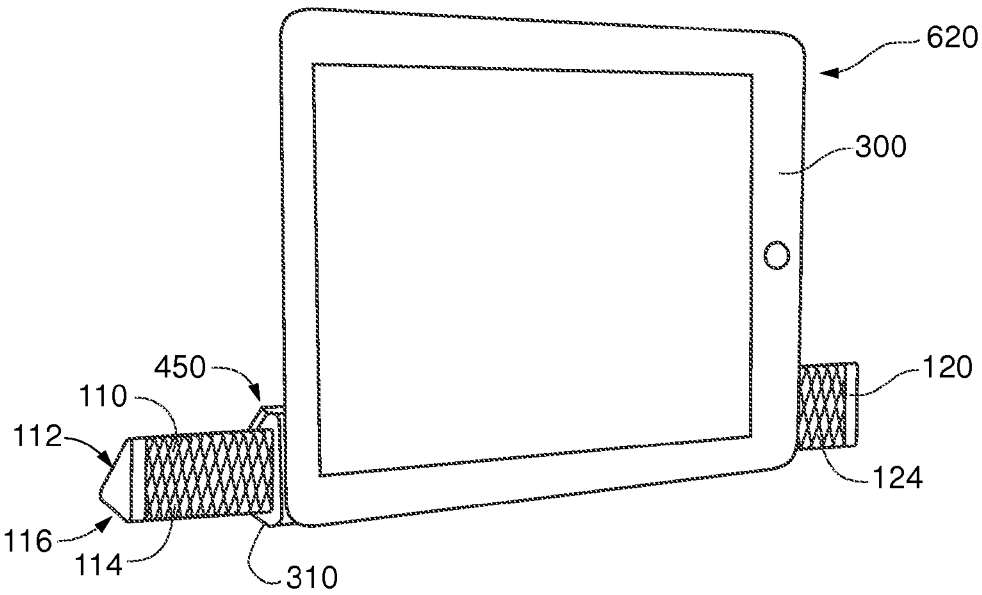
FIG. 6B is an isometric drawing showing an alternate configuration of the speaker bar and tablet computer cover being used as a stand for the tablet computer.

FIG. 6B shows an alternate configuration of speaker bar 100 and cover 310 used as a multimedia stand 620 for tablet computer 300. In this alternate configuration, side 170 of speaker bar 100, in contact with segment 312, serves as a base for tablet computer 300. Sides 114, 124 of retractable members 110, 120 remain oriented in a generally forward direction with respect to the screen of the tablet computer 300.

Figure 7:
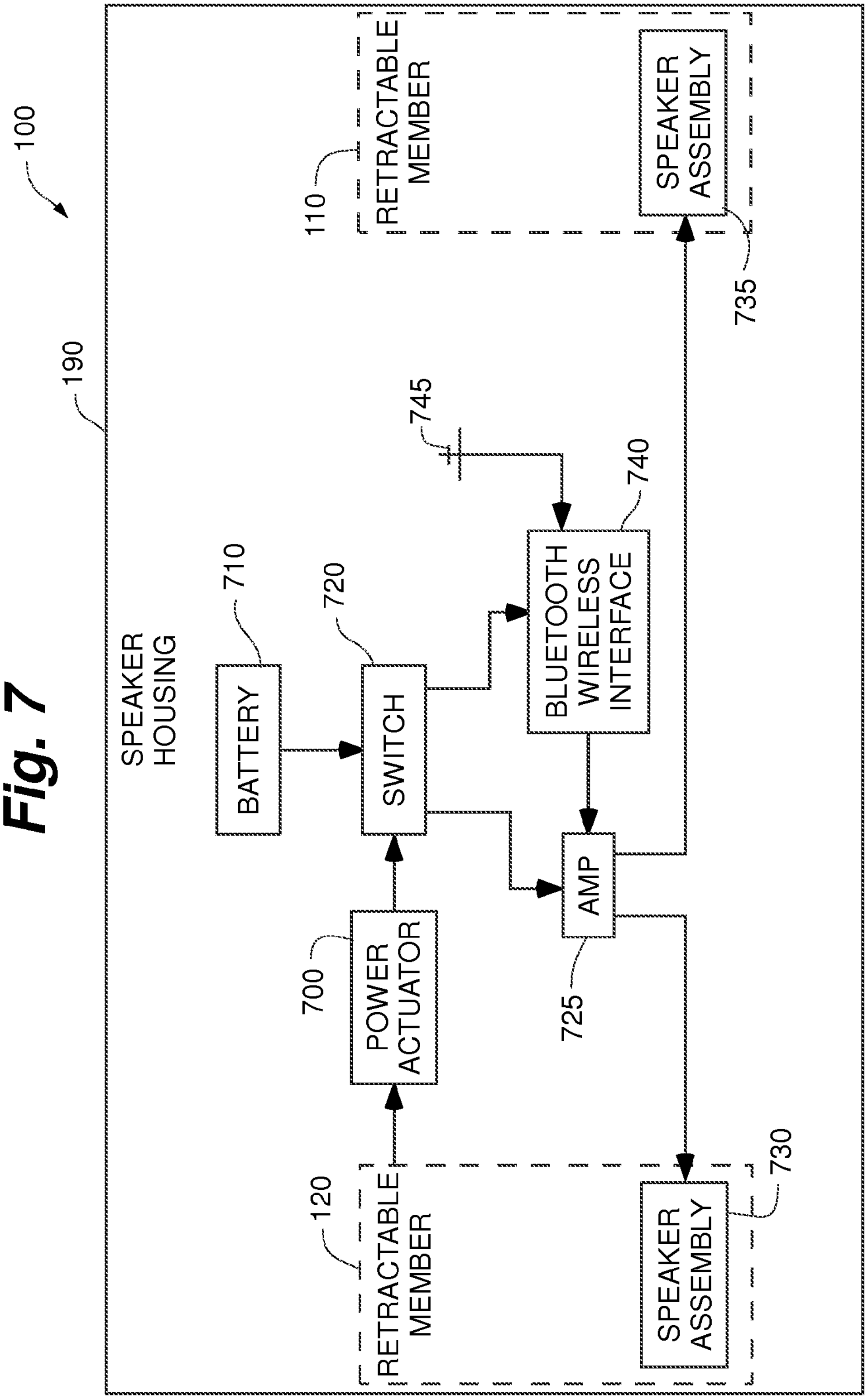
FIG. 7 is a block diagram of the internal components of the speaker bar.

FIG. 7 is a block diagram depicting the internal components of speaker bar 100. Speaker housing 190 contains retractable members 110, 120 that hold speaker assemblies

735 and 730 respectively. Retractable member 120 is operatively coupled to a power actuator 700 that connects to a switch 720. In the preferred embodiment, power actuator 700 responds when retractable member 120 extends and retracts. When retractable member 120 is retracted inside of speaker housing 190, the power actuator 700 causes switch 720 to open an electrical circuit, preventing battery power from reaching the internal components of speaker bar 100. When retractable member 120 is extended outside of speaker housing 190, the power actuator causes switch 720 to close an electrical circuit, providing battery power to the internal components. Power actuator 700 may be electrical or mechanical and may respond to the position of retractable member 120 and actuate switch 720 based on physical movement of retractable member 120. Power actuator 700 may be a mechanical push-button actuator, toggle actuator, electronic actuator, Hall effect sensor, or any other appropriate actuator to cause switch 720 to provide battery power to the internal components of speaker bar 100 when retractable member 120 is extended outside of speaker housing 190.

When extended, retractable member 120 causes power actuator 700 to activate switch 720 to turn on battery power to amplifier 725 and wireless interface 740. When retractable member 120 returns to its retracted position inside of speaker housing 190, power actuator 700 causes switch 720 to turn off battery power to amplifier 725 and wireless interface 740. The preferred embodiment shown in FIG. 7 does not require a separate on/off switch for user activation. In the preferred embodiment, battery 710 is a rechargeable lithium ion battery, but other types of suitable batteries may be used.

Wireless antenna 745 sends and receives wireless signals to and from an external wireless device such as a tablet computer. The wireless communication protocol may be Bluetooth protocol, IEEE 802.11 protocol, or any other appropriate wireless communication standard. Bluetooth wireless communication is used in the preferred embodiment because it is a widely accepted standard for many electronic devices. In the preferred embodiment, Bluetooth is initiated automatically when retractable member 120 is extended, and disconnected only when retractable member 120 is retracted. Speaker bar 100 is designed for a tablet computer 300, but may also be used with other Bluetooth-compatible devices.

Figure 8A:
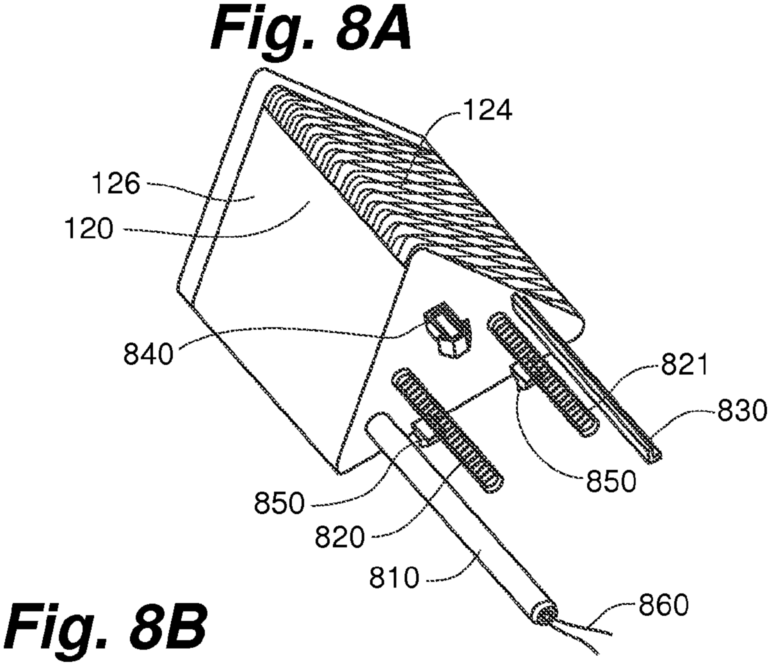
FIG. 8A is an isometric drawing of a speaker member.
Figure 8B:
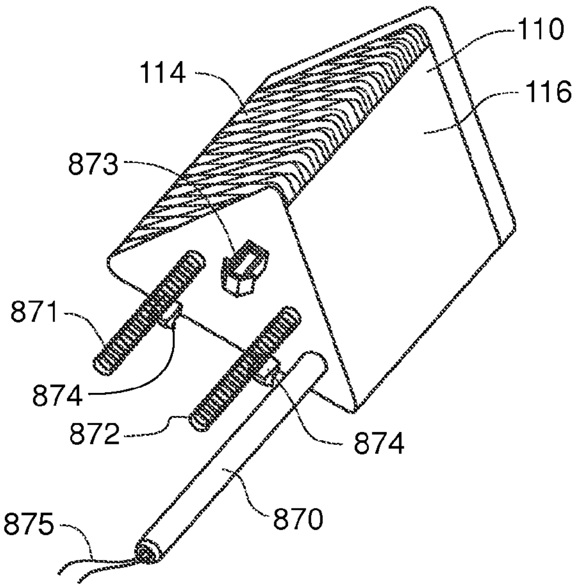
FIG. 8B is an isometric drawing of a second speaker member.
Figure 9:
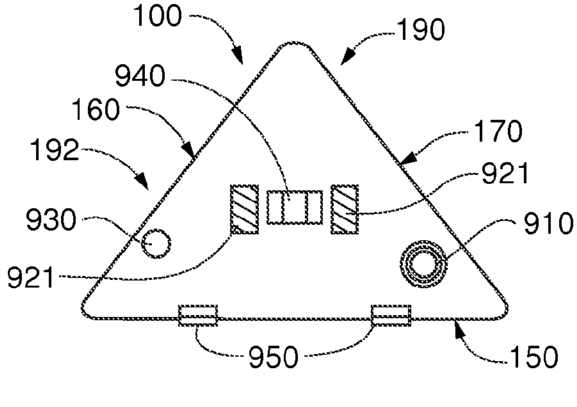
FIG. 9 is a cross-sectional view of a housing recess.

FIGS. 8A and 8B show an exemplary embodiment of the speaker members 110, 120. Although this embodiment is shown in the Figures, there are numerous ways in which the speaker members 110, 120 could be implemented to perform the same function. The embodiment in FIG. 8A will be described in connection with speaker member 120; speaker member 110 shown in FIG. 8B has features 870, 871, 872, 873, 874, 875 that correspond to features 810, 820, 821, 840, 850, 860 and perform similar functions. The features 870-875 of speaker member 110 operate similarly to the corresponding features of FIG. 8A. FIG. 9 is a cutaway side view of the back wall of recess 192 of speaker housing 190. The elements of FIG. 9 interact with the elements of speaker member 120 shown in FIG. 8A.

In the embodiment shown in FIG. 8A, speaker member 120 comprises a guide shaft 810 for guiding speaker member 120 as it extends and retracts inside speaker housing 190. Guide shaft 810 slides into a guide shaft hole 910 in the back wall of housing recess 192. Speaker wires 860 provide an electrical connection between a speaker assembly within speaker member 120 and amplifier 725 within speaker housing 190. Speaker wires 860 preferably are disposed within guide shaft 810 to protect speaker wires 860 from damage.

Speaker member 120 provides two springs 820, 821 that are compressed against surfaces 921 on the back wall of housing recess 192 when speaker member 120 is in a retracted state within speaker housing 190. The tension in springs 820, 821 provide an outward force to propel speaker member 120 outward from speaker housing 190 along a longitudinal axis 180 (see FIG. 1) of speaker bar 100 when speaker member 120 is extended. Speaker member 120 also comprises two tab stops 850 that slide along grooves 950 of speaker housing 190. The grooves 950 terminate at the ends of the speaker housing 190 with a lip (not shown). Tab stops 850 prevent speaker member 120 from extending beyond the ends of speaker housing 190 by engaging with the lip of the grooves 950 at the end of the housing 190.

Still referring to FIG. 8A, speaker member 120 comprises a male coupler 840 that is releasably coupled with female coupler 940 at the back wall of housing recess 192. The female coupler 940 and male coupler 840 engage with a "push-to-close"/"push-to-open" connection, whereby female coupler 940 grips male coupler 840 when inward force is applied to speaker member 120 along the longitudinal axis 180. In this "push-to-close" state, speaker member 120 is prevented from extending outward from speaker housing 190. When inward force is again applied to speaker member 120 along the longitudinal axis 180, the "push-to-open" state allows female coupler 940 to release male coupler 840. As discussed above, springs 820, 821 provide tension between the back wall of housing recess 192 and speaker member 120. When the female coupler 940 releases the male coupler 840, the springs 820, 821 propel the speaker member 120 to extend out the edges of the speaker housing 190. It is not necessary that the springs 820, 821 urge the speaker member 120 to its fully extended position, as a user could extend the speaker member 120 manually once it extends from the speaker housing 190. The connection between male coupler 840 and female coupler 940 could be implemented in a number of different ways. For example, the coupling mechanism of U.S. Pat. No. 5,984,565 may be adapted for this purpose. Other mechanisms known to one skilled in the art are contemplated and would be within the scope of the present invention.

As shown in FIG. 8A, speaker member 120 comprises a power actuator 830. The power actuator 830 is inserted into power actuator hole 930 in the back wall of housing recess 192 when speaker member 120 is retracted within speaker housing 190. Power actuator 830 engages a power switch (shown in FIG. 7) within speaker housing 190. The power switch is a normally-closed switch that is closed when speaker member 120 is extended, completing an electrical circuit to provide power to the electronic components of speaker bar 100. However, when speaker member 120 is retracted into speaker housing 190, power actuator 830 engages the switch and breaks the electrical circuit, thus turning off power to the electronic components of speaker bar 100, as discussed in relation to FIG. 7. Speaker member 110 in FIG. 8B does not have a feature corresponding to power actuator 830, as it is unnecessary to have two power actuators for speaker bar 100.

Figure 10:
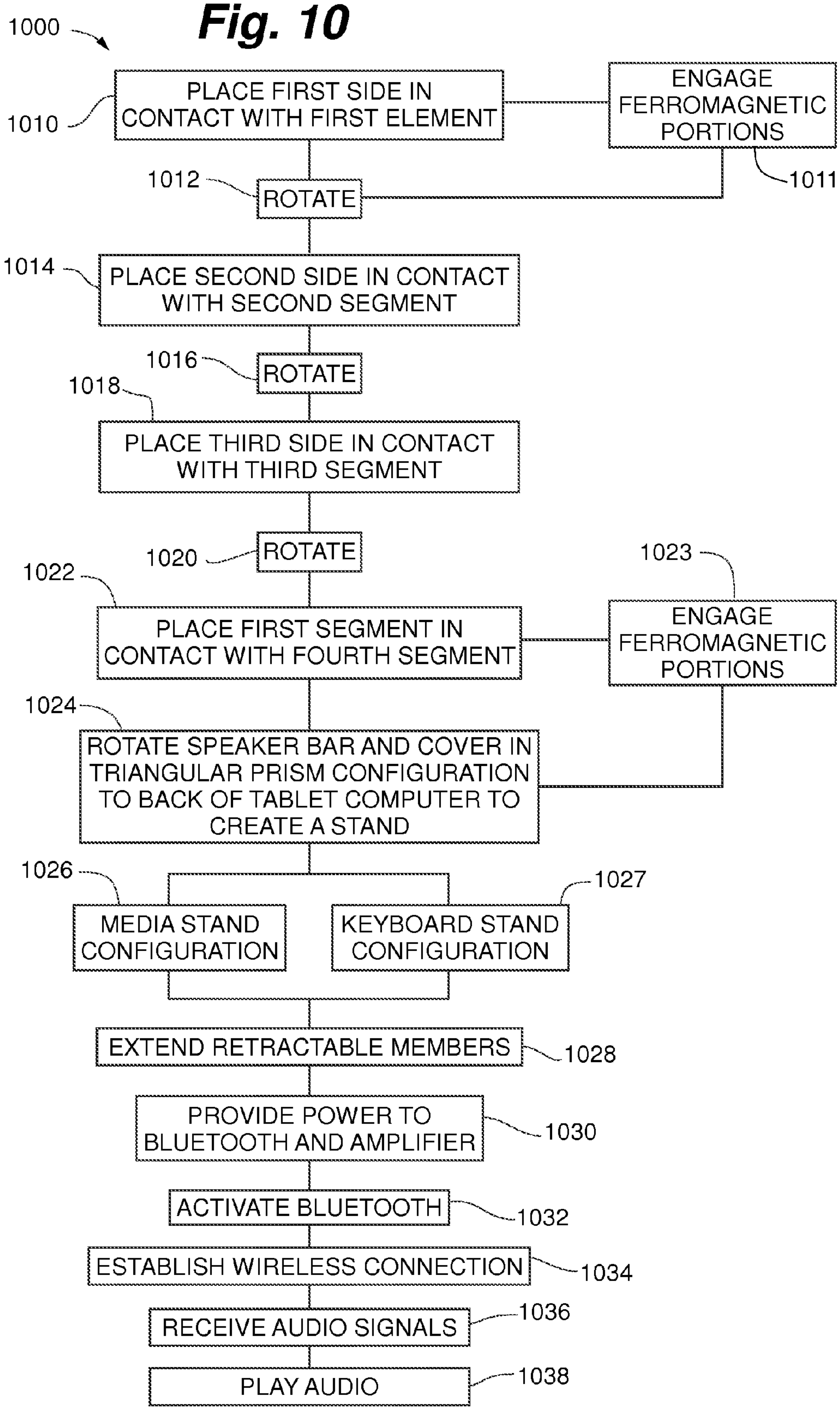
FIG. 10 is a flow chart demonstrating a method for coupling a speaker bar to a cover of a tablet computer.

FIG. 10 is a flow chart describing steps in a method 1000 for coupling a speaker bar to a tablet computer cover. Reference numbers used herein correspond to reference numbers used in FIGS. 1-9. In step 1010, a first side 170 of the speaker bar 100 is placed in contact with a first cover segment 312 of a tablet computer cover 310. In optional step 1011, a magnetic section 430 of the speaker bar housing 190 is engaged with a magnetic section 420 of the first cover segment 312. In step 1012, the speaker bar 100 and first cover segment 312 are rotated around a longitudinal axis 180 of the speaker bar 100. In step 1014, a second side 160 of the speaker bar 100 is placed in contact with a second segment 314 of the tablet computer cover 310, then rotated around a longitudinal axis 180 of the speaker bar in step 1016. In step 1018, a third side 150 of the speaker bar 100 is placed in contact with a third segment 316 of the tablet computer cover, then rotated around a longitudinal axis 180 of the speaker bar 100 in step 1020.

In step 1022 of FIG. 10, the first segment 312 of the tablet computer cover 310 is placed in contact with a fourth segment 318 of the tablet computer cover 310. In optional step 1023, the magnetic section 420 of the first segment 312 engages a magnetic section 410 of the fourth segment 318. The speaker bar 100 and tablet computer cover 310 are then in a triangular prism formation 450. In step 1024 of the method of FIG. 10, the speaker bar 100 and cover 310 are rotated to the back of a tablet computer 300 to create a stand for the tablet computer 300. The speaker bar 100, tablet computer 300, and tablet computer cover 310 may form a media stand configuration 620 in step 1026, or a keyboard stand configuration 610 in step 1027. Next, in step 1028 retractable members 110, 120 of the speaker bar 100 are extended. In step 1030 power is provided to a Bluetooth wireless interface 740 and an amplifier 725 within the speaker bar 100. In the preferred embodiment, power is provided automatically after the retractable members 110, 120 are extended. In step 1032 the Bluetooth wireless interface 740 is activated. Wireless communication is established between the Bluetooth wireless interface 740 and the tablet computer 300 in step 1034. In step 1036 the speaker bar 100 receives audio signals from the tablet computer 300 through the Bluetooth wireless interface 740, and in step 1038 the speaker bar 100 plays back audio from the tablet computer 300.

The many features and advantages of the invention are apparent from the above description. Numerous modifications and variations will readily occur to those skilled in the art. For example, the speaker housing could have a rectangular prism shape with a rectangular cross section, or a half-cylinder shape with a half-circle cross section. The speaker bar could also be sized to fit a device such as a mobile phone or a portable music player. Since such modifications are possible, the invention is not to be limited to the exact construction and operation illustrated and described. Rather, the present invention should be limited only by the following claims.

What is claimed is:

1. A speaker for a tablet computer, the speaker comprising:

a) an elongated housing having
  i) a longitudinal axis,
  ii) a first housing recess at a first end of the housing,
  iii) a second housing recess at a second end of the housing opposite the first end of the housing;

b) a first retractable member sized to fit within the first housing recess and moveable along the longitudinal axis of the housing, the first retractable member having a first speaker assembly for projecting sound;

c) a second retractable member sized to fit within the second housing recess and moveable along the longitudinal axis of the housing, the second retractable member having a second speaker assembly for projecting sound;

the speaker having a first configuration in which the first and second retractable members are enclosed within the first and second housing recesses, and a second configuration in which the first and second retractable members are at least partially outside of the first and second housing recesses;

wherein the first configuration and second configuration are aligned along the longitudinal axis of the housing and the distance between the first retractable member and second retractable member is larger in the second configuration than in the first configuration; and further comprising:

d) wireless communication circuitry; wherein the wireless communication circuitry receives wireless audio signals when the first and second retractable members are in the second configuration, and the wireless communication circuitry does not receive wireless audio signals when the first and second retractable members are in the first configuration.

2. The speaker of claim 1, wherein the wireless audio signals are Bluetooth wireless signals.

3. The speaker of claim 1, wherein the housing has a generally uniform cross-section, the first retractable member has a cross-section, and the cross-section of the housing is geometrically similar to the cross-section of the first retractable member.

4. The speaker of claim 3, wherein the housing cross-section is triangular.

5. A speaker for a tablet computer, the speaker comprising:

a) an elongated housing having
  i) a longitudinal axis,
  ii) a first housing recess at a first end of the housing,
  iii) a second housing recess at a second end of the housing opposite the first end of the housing;

b) a first retractable member sized to fit within the first housing recess and moveable along the longitudinal axis of the housing, the first retractable member having a first speaker assembly for projecting sound;

c) a second retractable member sized to fit within the second housing recess and moveable along the longitudinal axis of the housing, the second retractable member having a second speaker assembly for projecting sound;

the speaker having a first configuration in which the first and second retractable members are enclosed within the first and second housing recesses, and a second configuration in which the first and second retractable members are at least partially outside of the first and second housing recesses;

wherein the first configuration and second configuration are aligned along the longitudinal axis of the housing and the distance between the first retractable member and second retractable member is larger in the second configuration than in the first configuration;

further wherein electrical power is provided to the first and second speaker assemblies when the first and second retractable members are in the second configuration, and electrical power is not provided to the first and second speaker assemblies when the first and second retractable members are in the first configuration.

6. A speaker for a tablet computer, the speaker comprising:

a) an elongated housing having
  i) a longitudinal axis,
  ii) a first housing recess at a first end of the housing,
  iii) a second housing recess at a second end of the housing opposite the first end of the housing;

b) a first retractable member sized to fit within the first housing recess and moveable along the longitudinal axis of the housing, the first retractable member having a first speaker assembly for projecting sound;

c) a second retractable member sized to fit within the second housing recess and moveable along the longitudinal axis of the housing, the second retractable member having a second speaker assembly for projecting sound;

the speaker having a first configuration in which the first and second retractable members are enclosed within the first and second housing recesses, and a second configuration in which the first and second retractable members are at least partially outside of the first and second housing recesses;

wherein the first configuration and second configuration are aligned along the longitudinal axis of the housing and the distance between the first retractable member and second retractable member is larger in the second configuration than in the first configuration;

wherein the housing is sized to fit inside a cover of the tablet computer, the length of the housing is equal to the length of the tablet computer cover, and the housing is enclosed inside the tablet computer cover with a friction fit.

7. The speaker of claim 6, wherein the housing has a housing magnetic section, the tablet computer cover has a cover magnetic section, and the housing magnetic section is magnetically coupled with the cover magnetic section when the housing is enclosed inside the tablet computer cover.

8. A method for coupling a speaker bar with a tablet computer cover, the speaker bar having first, second, and third speaker bar sides and a longitudinal axis, the tablet computer cover being apportioned into segments including a first cover segment, a second cover segment adjacent lengthwise to the first cover segment, and a third cover segment adjacent lengthwise to the second cover segment, the method comprising:

a) placing the first speaker bar side in physical contact with the first tablet computer cover segment and maintaining the contact;

b) rotating the speaker bar around the longitudinal axis so as to place the second speaker bar side in physical contact with the second tablet computer cover segment and maintaining the contact; and c) rotating the speaker bar around the longitudinal axis so as to place the third speaker bar side in physical contact with the third tablet computer cover segment and maintaining the contact;

wherein the speaker bar and tablet computer cover couple with a friction fit.

9. The method of claim 8, wherein the tablet computer cover comprises a fourth cover segment adjacent lengthwise to the third cover segment, the method further comprising:

d) rotating the speaker bar around the longitudinal axis so as to place the first cover segment into physical contact with the fourth cover segment and maintaining the contact.

10. The method of claim 8, wherein the housing of the speaker bar is primarily non-magnetic, the first speaker bar side has a first magnetic section, the first tablet computer cover segment has a second magnetic section, and wherein step a) further comprises magnetically engaging the first and second magnetic sections.

11. The method of claim 8, wherein the speaker bar has a first retractable member containing a first speaker assembly and a second retractable member containing a second speaker assembly, the method further comprising:

d) extending the first and second retractable members in opposite directions along the longitudinal axis of the speaker bar so that the first and second speaker assemblies are at least partially outside of the speaker bar housing and the tablet computer cover.

12. The method of claim 11, wherein the first speaker assembly and the second speaker assembly project sound in a direction orthogonal to the longitudinal axis of the speaker housing.

13. The method of claim 11, wherein the speaker bar comprises wireless communication circuitry, the method further comprising:

e) receiving wireless audio signals at the wireless communication circuitry; and f) using the wireless audio signals to project sound in a direction orthogonal to the longitudinal axis of the speaker housing.

14. The method of claim 11, wherein step d) initiates power to be sent to the first and second speaker assemblies.

15. A system comprising:

a) a tablet computer;

b) a speaker bar having i) an elongated speaker housing having a longitudinal axis and a speaker housing length, ii) first and second retractable speaker members disposed at opposite ends of the speaker housing, the first and second retractable speaker members being movable along the longitudinal axis between a recessed position inside the speaker housing and an extended position at least partially outside of the speaker housing, and iii) wireless communication circuitry able to receive wireless audio signals from the tablet computer;

c) a tablet computer cover having first, second, and third longitudinally adjacent segments forming a triangular prism configuration;

wherein the speaker bar is coupled with the tablet computer cover in the triangular prism configuration to provide a stand for the tablet computer.

16. The system of claim 15, wherein the speaker bar housing is fully enclosed in the tablet computer cover, and the first and second retractable speaker members are extended at least partially outside of the tablet computer cover.

17. The system of claim 15, wherein at least one of the first, second, and third cover segments has a cover magnetic section, the housing has a housing magnetic section, and the cover magnetic section is magnetically engaged with the housing magnetic section.

18. The system of claim 15, wherein the speaker bar further comprises a power actuator activating a switch to cause the wireless communication circuitry to receive wireless audio signals from the tablet computer when the first and second retractable speaker members are in the extended position.

* * * * *